United States Patent [19]
Ito et al.

[11] Patent Number: 5,992,882
[45] Date of Patent: *Nov. 30, 1999

[54] FOLDED AIR BAG AND AIR BAG FOLDING METHOD

[75] Inventors: Takayuki Ito, Ama-gun; Masafumi Kurokawa, Ichinomiya, both of Japan

[73] Assignee: Toyoda Gosei Co., Ltd., Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,730

[22] Filed: Jan. 31, 1997

[30] Foreign Application Priority Data

Feb. 2, 1996 [JP] Japan ................................ 8-017768

[51] Int. Cl.⁶ .................................................. B60R 21/16
[52] U.S. Cl. .................................... 280/743.1; 280/728.1
[58] Field of Search ............................. 280/728.1, 743.1, 280/743.2

[56] References Cited

U.S. PATENT DOCUMENTS 5,300,011  4/1994  Budde et al. .
5,566,977  10/1996  Wipasuramonton .
5,568,938  10/1996  Lindstrom ............................. 280/743.1

FOREIGN PATENT DOCUMENTS 1392677  2/1964  France .
5-16751  1/1993  Japan .
5-139238  6/1993  Japan .

OTHER PUBLICATIONS

Search Report, May 28, 1997.

*Primary Examiner*—Paul N. Dickson
*Attorney, Agent, or Firm*—Pillsbury Madison & Sutro LLP

[57] ABSTRACT

An air bag, when inflated, is in the form of a substantially rectangular bag having a front edge, two side edges, and a rear edge. The air bag is folded in such a manner that the front edge approaches the rear edge and the two side edges are each folded inwardly at predetermined intervals, forming first creases which lie perpendicular to the side edge portions, and a pair of opposing walls located between the front and rear edges which are each folded inwardly at predetermined intervals, forming second creases which are positioned perpendicular to the side edges and are continuous with the first creases.

9 Claims, 11 Drawing Sheets

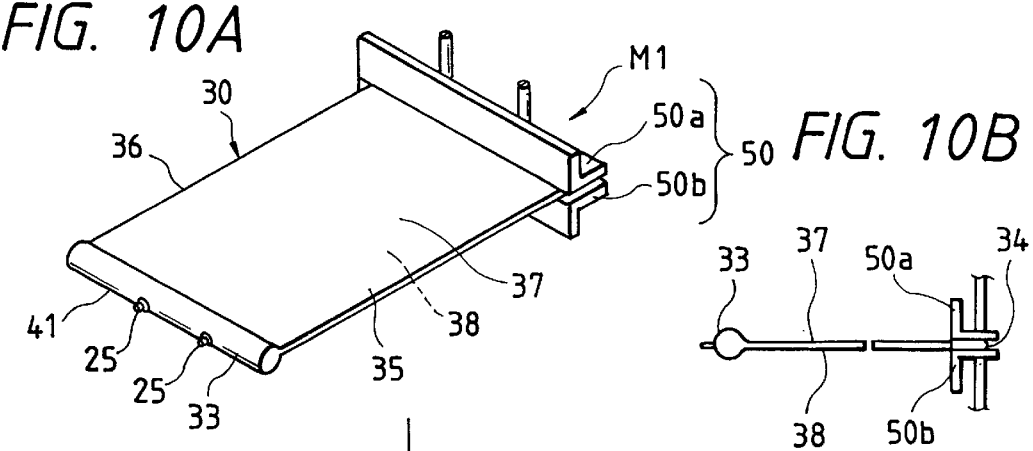
FIG. 10A
FIG. 10B
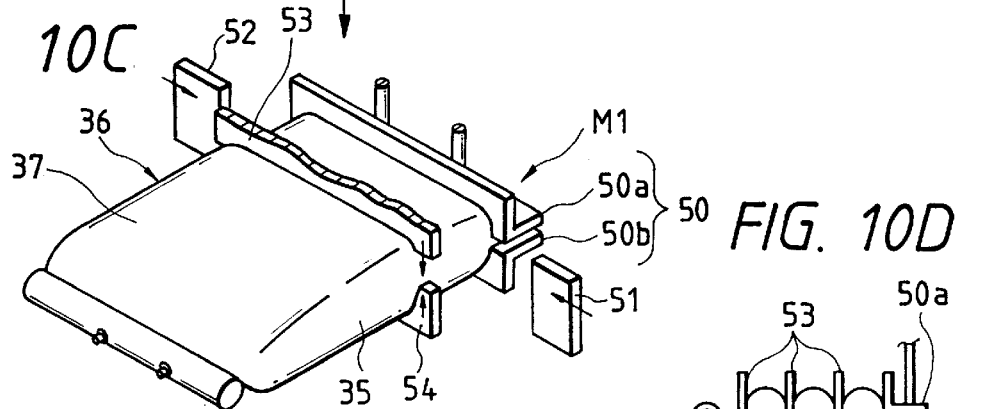
FIG. 10C
FIG. 10D
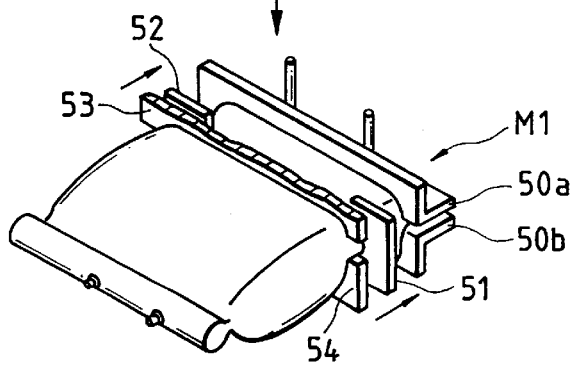
FIG. 10E
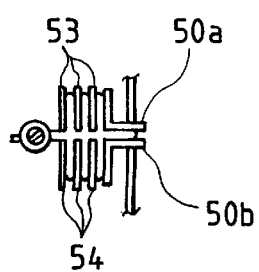
FIG. 10F

FOLDED AIR BAG AND AIR BAG FOLDING METHOD

BACKGROUND OF THE INVENTION

1. Field of the Invention

This invention relates to an air bag and a folding method that will permit an air bag device to be desirably inflated when necessary. In particular, the invention concerns an air bag for side collision protection which is arranged between a passenger and a vehicle wall such as a door.

2. Description of the Prior Art

Heretofore, passenger air bags and driver side collision air bags (hereinafter referred to as "a side collision air bag", when applicable) have been formed by sewing two pieces of cloth material which are substantially rectangular. Hence, the air bag is substantially rectangular when inflated. The air bag is connected to the inflator of the air bag device, and folded down, and accommodated in a seat or similar structure.

The air bag is folded down according to a folding method so that it will be quickly inflated (cf. Japanese Patent Publication No. Hei. 5-139238).

In the folding method as shown in FIGS. 1 to 3, which is a form of telescoping procedure, the front end portion 3 of the air bag, which moves outwardly upon inflation in an emergency, is pushed inwardly towards the rear end portion 2 of the air bag; that is, it is inserted into the rear end portion 2. This operation is repeatedly carried out, so that the front end portion 3 of the air bag is folded down while being shrunk. Hence, it is difficult to mechanically fold the air bag, and it is necessary to fold down manually.

As described above, the front end portion 3 is pushed into the rear end portion 3, and this pushing operation must be carried out repeatedly. In addition, the front end portion 3 is equal both in outside diameter and in inside diameter to the rear end portion. Hence, the manual folding operation requires many man-hours and additional time to couple the folded air bag to the body of the air bag device. Accordingly, the resultant air bag device has high manufacturing costs.

SUMMARY OF THE INVENTION

Accordingly, an object of the invention is to eliminate the above-described difficulties accompanying such a conventional air bag device. More specifically, an object of the invention is to provide an air bag which is so folded down that it can be inflated quickly in an emergency, and can be folded down with ease, thereby contributing to an increase in productivity of an air bag devices, and provides an improved method of folding air bags (hereinafter referred to as "an air bag folding method", when applicable).

According to the present invention, there is provided a folded air bag accommodated in an air bag device that has a substantially rectangular form when inflated. The air bag includes a rear edge along which an inflator for supplying an inflating gas is attached and two side edges which extend from both ends of the rear edge so as to be in parallel with each other. A front edge is formed by connecting together the ends of the two side edges and is located opposed to the rear edge. A pair of walls are located between the front and rear edge portions to define two confronted faces of the rectangular form when inflated. The two side edges are each folded inwardly at predetermined intervals while first creases are formed perpendicular to the side edges. The pair of wall portions are each folded outwardly at predetermined intervals while second creases are formed perpendicular to the side edges and continuous with the first creases, whereby the front edge approaches the rear edge.

Further, according to the present invention, there is provided a method for folding an air bag comprising the steps of first inflating the air bag with air. A front end of the air bag is retained so that two wall portions of the air bag can be folded outwardly at predetermined intervals. Two side portions of the air bag are folded inwardly at the same intervals as the outwardly folding step. Air is then removed from the air bag and the air bag is collapsed while keeping the folded shape of the air bag to thereby achieve a fully folded air bag.

As described above, the air bag according to the invention is folded down in such a manner that the two side edges are each folded inwardly at predetermined intervals, first creases are formed perpendicular to the side edges, and a pair of wall portions, located between the front and rear edge portions and which will confront each other when inflated, are each folded inwardly at predetermined intervals, forming second creases which are perpendicular to the side edges and continuous with the first creases.

That is, in the air bag of the invention, the two side edges and the two wall confronting portions are folded in the form of a bellows. Hence, when the inflator is activated, the front edge portion of the air bag moves instantaneously forwardly so that the time required for the air bag to inflate is extremely short.

In the air bag folding method, the first creases formed when the two side edges are folded inwardly are continuous with the second creases which are formed when the two walls are folded outwardly. The two side edges are folded inwardly, beginning with the rear edge or front edge, to form the first creases, and the two walls are then folded outwardly along the prolongations of the first creases. This folding operation is repeatedly carried out until the opposite front or rear edge is reached. Thus, the air bag folding method of the invention allows the air bag to be folded down while also being shrunk. In this case, the air bag can be more readily manually folded down by supplying some air into the air bag to inflate the air bag to some extent, and as the air bag is folded the air is gradually exhausted from the air bag.

As is apparent from the above description, the air bag is folded in a way that permits quick inflation when necessary, and yet allows it to be folded with ease. This means that folding air bags according to the invention can have a high productivity.

In the air bag folding method of the invention, with the air bag being at least partially inflated with air, the front end is retained with a position regulating member, and wall portion folding boards are pushed against the two walls at positions where the two walls should be folded outwardly, while side edge folding boards are also pushed against the two sides at positions where the sides should be folded inwardly. Under this condition, while the air is gradually exhausted from the air bag, the rear edge, the side edge folding boards, and the wall folding boards are pushed towards the position regulating member, and thereafter the side edges folding boards and the wall folding boards are removed from the air bag. Hence, the air bag is quickly folded outwardly and inwardly as required. Such an air bag device can be produced quickly and the air bag can be folded with a small number of folding steps, and will still be quickly inflated. Furthermore, if a member for retaining the rear edge is provided, and air cylinders are employed to move the side edges folding boards and the wall folding boards, then the air bag can be mechanically folded with ease, which will further improve productivity.

In the air bag, and in the air bag folding method of the invention, the air bag may be folded down in such a manner that its portions which are folded outwardly, as viewed in a section perpendicular to the rear end, fall forwardly or fall backwardly while being divided substantially in two parts, right and left. In this case, the air bag thus folded is reduced in width. Especially in the case where the air bag is folded in such a manner that the portions folded outwardly, as viewed in a section perpendicular to the rear end, fall backwardly while being divided substantially in two parts, right and left, and cover a part of the inflator, then the dimension between the inflator and the front end of the air bag thus folded is greatly reduced. Hence, the installation of the resultant air bag device requires only a small space.

Other objects, features, and characteristics of the invention will become apparent upon consideration of the following description and the appended claims with reference to the accompany drawings, all of which form a part of this specification and wherein like reference numerals represent corresponding parts in the various views.

BRIEF DESCRIPTION OF THE DRAWINGS

In the accompanying drawings:

FIGS. 10A–10F show the method of mechanically folding the air bag;

DETAILED DESCRIPTION OF THE PREFERRED EMBODIMENTS

The preferred embodiments of the present invention will be described with reference to the accompanying drawings.

Figure 1:
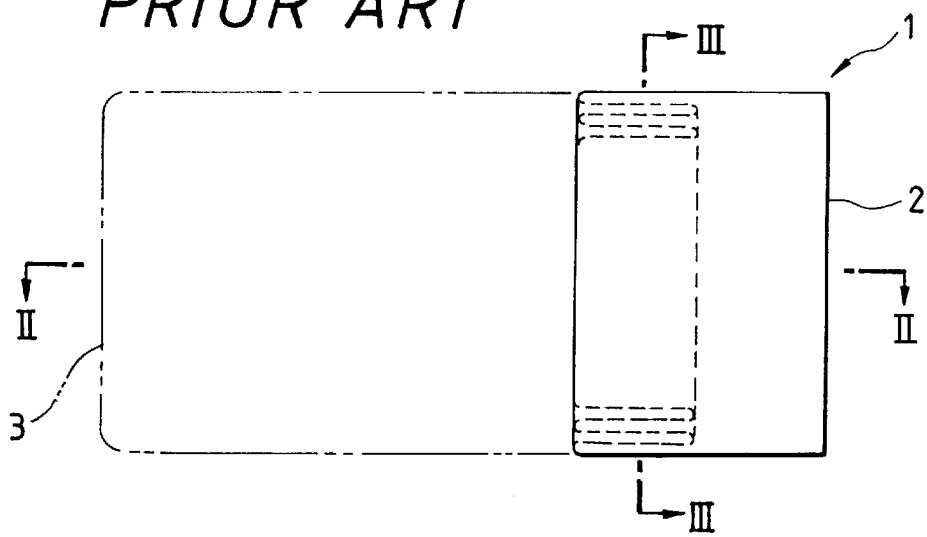
FIG. 1 is a side view showing how a conventional air bag is folded down.
Figure 2:
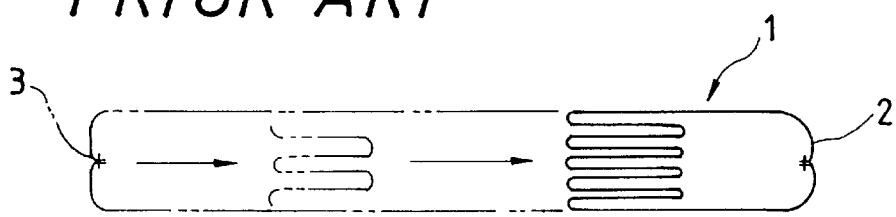
FIG. 2 is a sectional view taken along the line II—II in FIG. 1.
Figure 3:
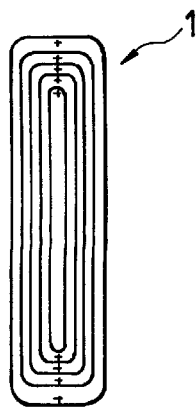
FIG. 3 is a sectional view taken along the line III—III in FIG. 1.
Figure 4:
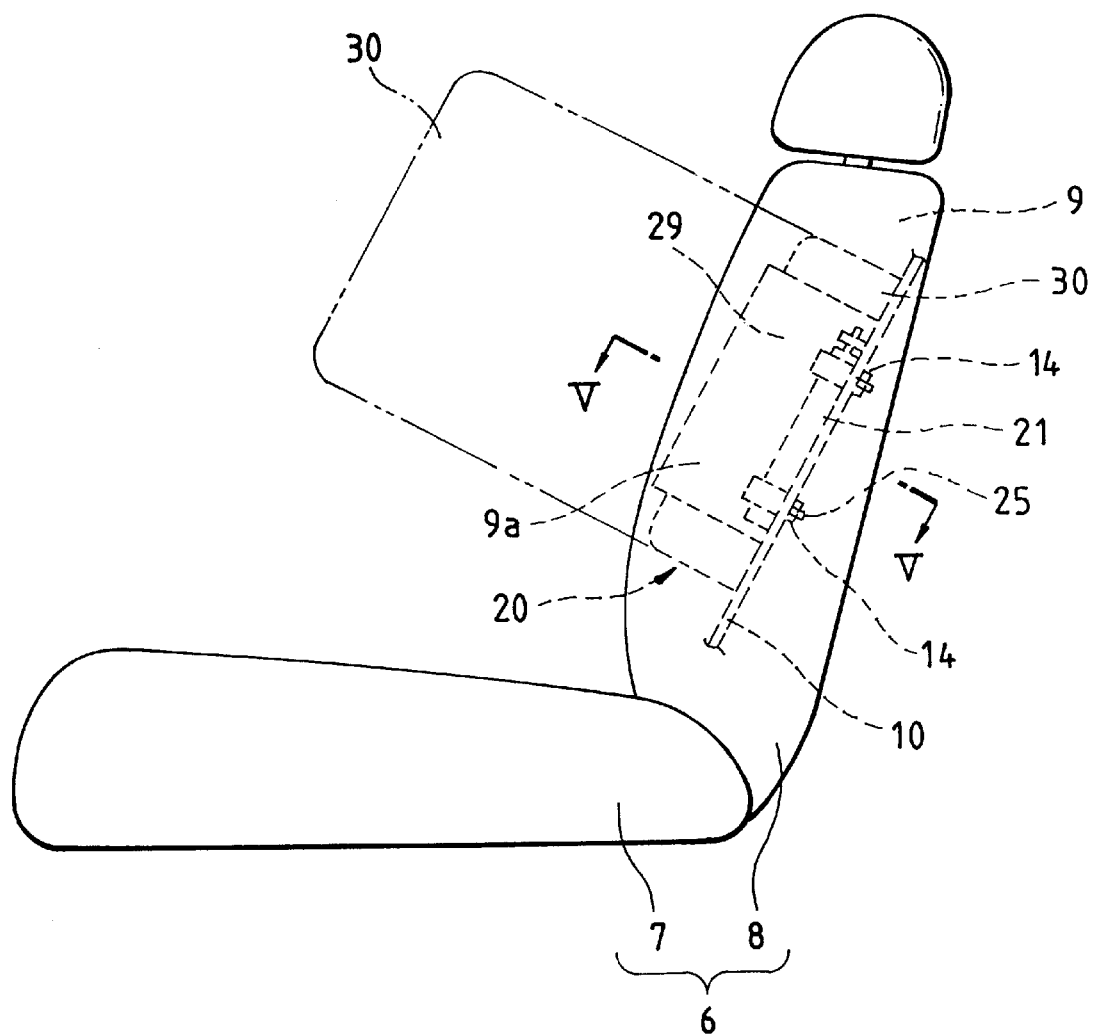
FIG. 4 is a side view showing the use of an air bag, which constitutes a first embodiment of the invention.
Figure 5:
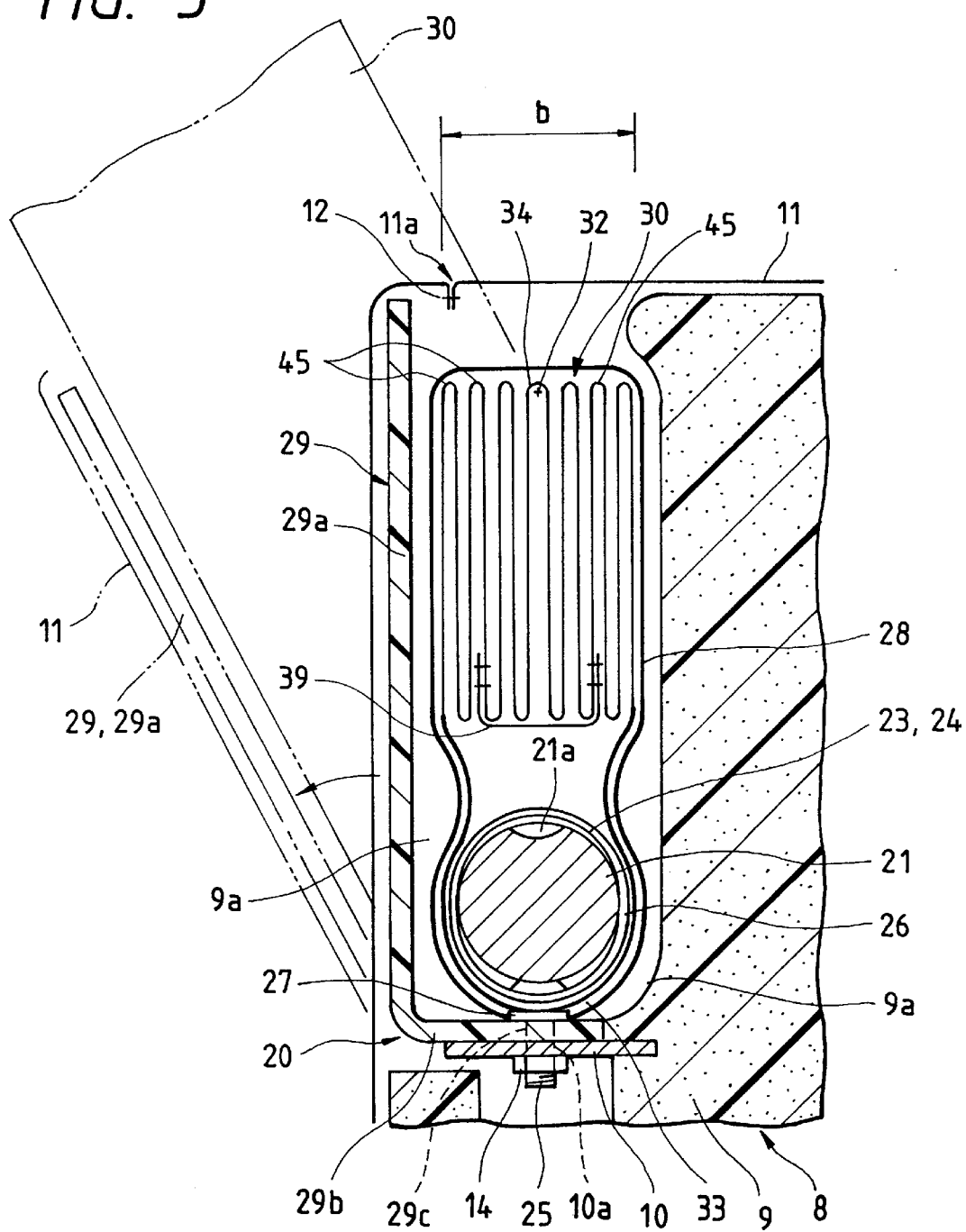
FIG. 5 is an enlarged sectional view taken along the line V—V in FIG. 4.
Figure 6:
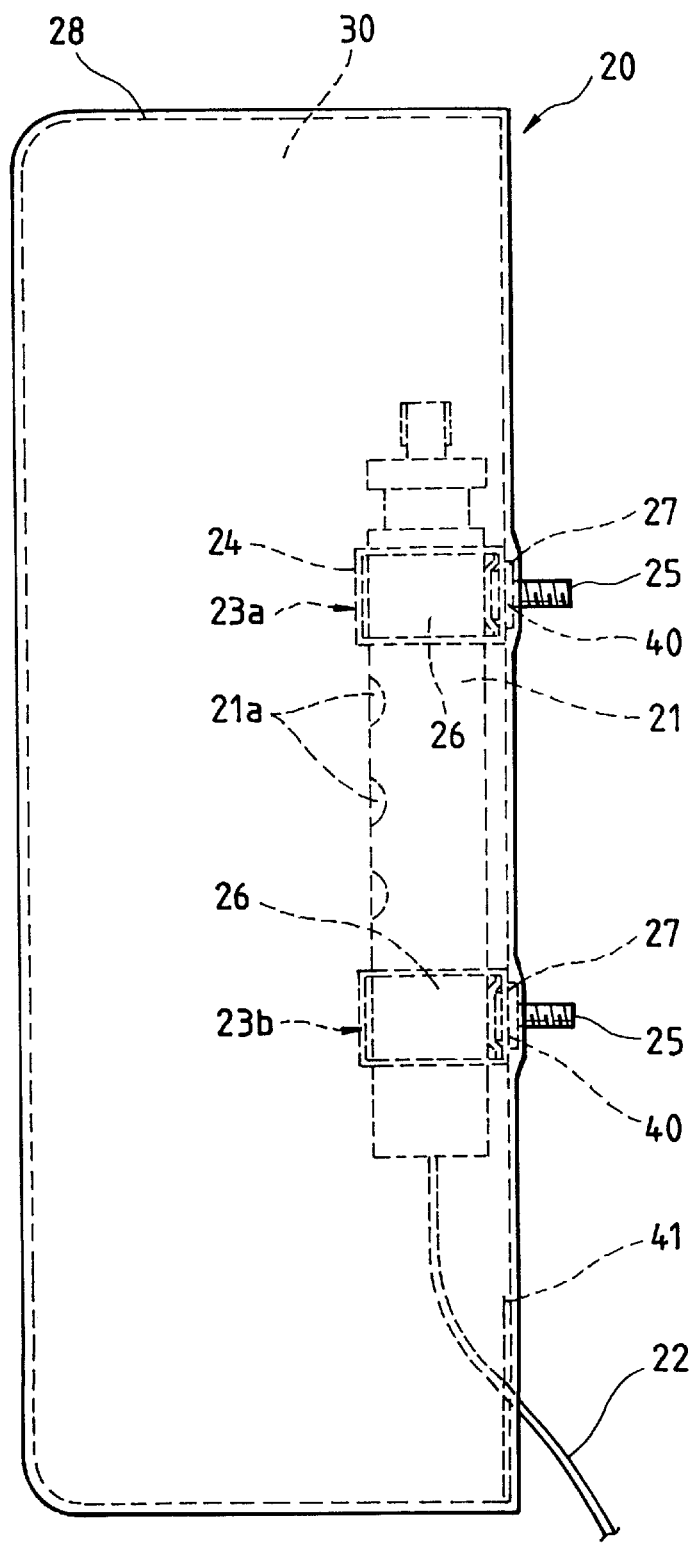
FIG. 6 is a side view of the air bag shown in FIG. 4.

In FIGS. 4, 5 and 6, reference numeral 30 designates an air bag according to a first embodiment of the invention, which is applied to an air bag device 20 for protection of a passenger or driver during a side collision of the vehicle. The seat assembly 6 comprises a seat bottom 7 and a seat back 8. The air bag device 20 is set, for example, on the left side of the seat back 8 adjacent the side door of the vehicle.

On the left side of the seat back 8, a body 9 of urethane material has an accommodating recess 9a' which extends vertically. On the surface of the accommodating recess 9a on the rear side of the vehicle, a frame 10 extends substantially vertically in such a manner that it is inclined slightly backwardly. The frame 10 has mounting holes 10a at two predetermined positions. The outer surface of the seat back 8 is covered with a surface skin 11 made of ornament cloth. The surface skin 11 has a seam 11a at the front of recess 9a, as shown in FIG. 5, so that the surface skin 11 can be readily broken when the air bag 30 contained in that recess is inflated. The seam 11a is formed by cutting the surface skin 11 to form an opening, and thereafter the surface skin 11 is sewn closed with a sewing thread 12.

The air bag device 20 comprises an inflator 21, a folded air bag 30 and a cover 29.

The inflator 21, in the form of a cylinder having aplurality of gas jet holes 21a in the cylindrical surface, is arranged inside the air bag 30 and on the side of the rear edge portion 33 of the air bag 30. The lower end of the inflator 21 is connected to a lead wire 22 to which a gas generating signal is applied. The lead wire 22 is connected through a hole 41 in the air bag 30 to a connector (not shown) which is connected to a conventional air bag operating circuit.

The inflator 21 has a pair of upper and lower mounting brackets 23a and 23b. Each of the mounting brackets 23a and 23b is in the form of a cylinder made of a metal plate, and comprises a sleeve 24 to which a bolt 25 is welded in such a manner that the bolt 25 extends radially outwardly. A cushion member 26 is fixedly bonded to the inner surface of the sleeve 24. Those mounting brackets 23a and 23b are fixedly mounted on the inflator 21. In this connection, it should be noted that the inside diameter of the sleeve 24 is larger than the outside diameter of the inflator 21. Hence, the sleeve 24 is mounted through the cushion member 26 on the inflator 21, and it is fixedly mounted on the inflator 21 by crimping in such a manner that the sleeve 24 is partly decreased in diameter.

The bolts 25 of the mounting brackets 23, fixedly secured to the inflator 21, are passed through the mounting holes 40 (cf. FIGS. 6 and 7) of the air bag 30 and through spring nuts 27 and a bracket 29b of the cover 29 and through mounting holes 10a of the frame 10, and are then tightened with nuts 14, so that the air bag device 20 is fixedly secured to the seat back 8.

The cover 29 includes a plate-shaped rectangular body 29a, which covers a side surface of the sheet back body 9, and the bracket 29b which is integral with the body 29a and forms right angles with the body 29a. The bracket 29b has two mounting holes 29c into which the bolts 25 are inserted, respectively.

Figure 7C:
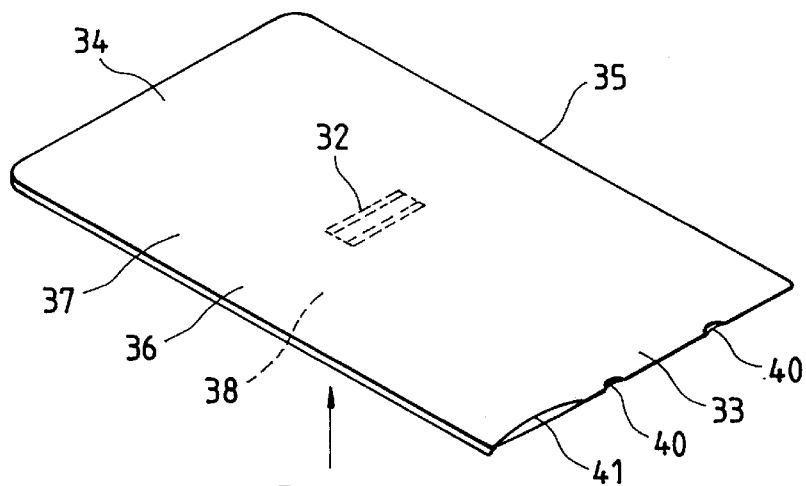
FIGS. 7A–7C are diagrams showing the step in the manufacture of the air bag shown in FIG. 4.
Figure 7B:
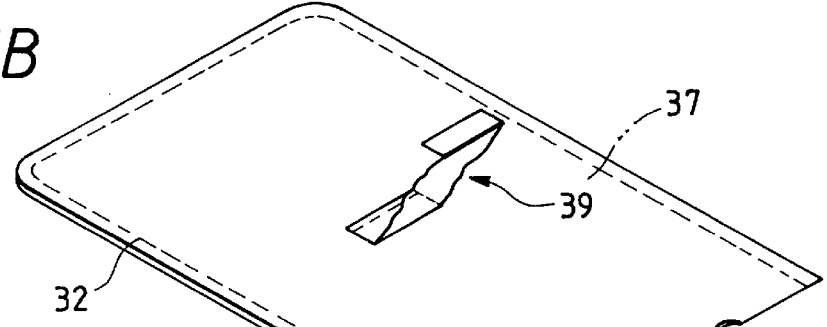
Figure 7A:
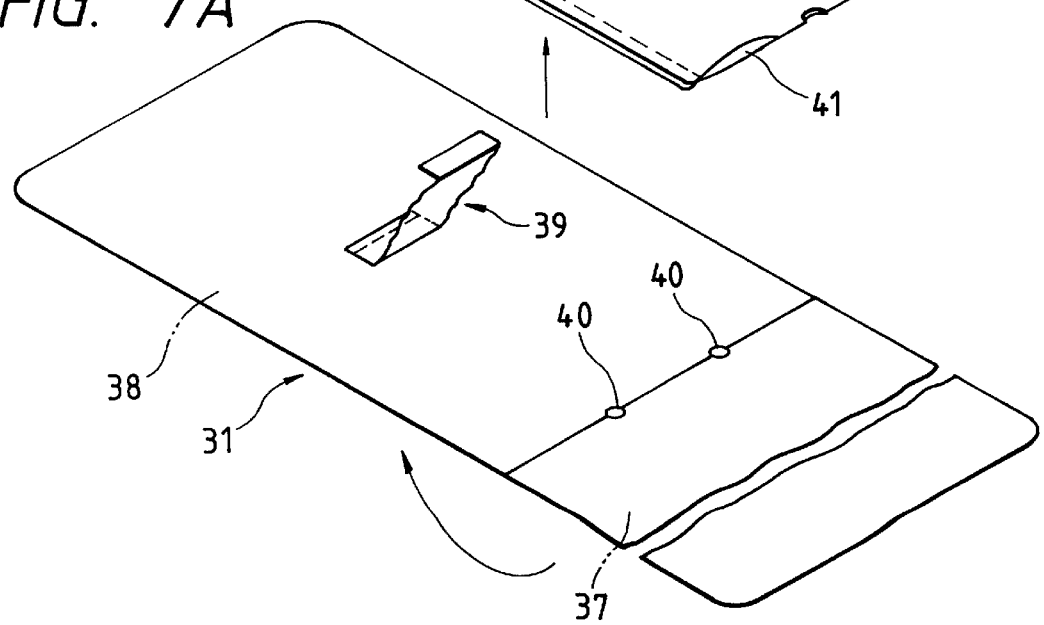

As shown in FIGS. 7A–7C, the air bag 30 is formed by combining the peripheral edges of wall portions 37 and 38 with each other. Each of the wall portions 37 and 38 is substantially rectangular having four edge portions, namely, a rear edge portion 33 on the side of the inflator 21, two (right and left) side edge portions 35 and 36, respectively, which extend from opposite ends of the rear edge portion 33 in such a manner that they are in parallel with each other, and a front edge portion 34 formed in such a manner that the remaining ends of the side edge portions 35 and 36 are connected to each other, so that the front edge portion 34 is opposed to the rear edge portion 33. That is, the air bag 30, when inflated, is like an inflated rectangular bag. The rear edge portion 33 has a pair of upper and lower mounting holes 40 and a slit-shaped vent hole 41 in the lower part thereof. Inside the air bag 30, a teaser 39 is provided which couples the rectangular wall portions 37 and 38 to each other so that the air bag is substantially rectangular (not spherical) when inflated (cf. FIGS. 5 and 7). The teaser 39 is formed by using a piece of woven cloth of polyamide or polyester similarly as in the case of the base cloth 31 of the air bag 30 (described later).

Manufacture of the air bag 30 is as follows.

As shown in FIG. 7A, the base cloth, which is a piece of woven cloth of polyamide or polyester, is cut to a predetermined configuration, and the mounting holes 40 and 40 are formed at the middle. Under this condition, one end portion of the teaser 39 is sewn to one of the wall portions 37 and 38 with sewing thread 32.

Next, as shown in FIG. 7B, the base cloth 31 is folded along the middle line (on which the mounting holes 40 are arranged) into two parts, and the periphery of the base cloth 31 thus folded are sewed with sewing thread 32. The crease (or folding line) is partially cut to form the vent hole 41.

Thereafter, as shown in FIG. 7C, the base cloth thus processed is turned inside out, and the other end portion of the teaser 39 is sewn to the other wall portion. Thus, the air bag 30 has been manufactured but it is not folded yet.

Alternatively, the air bag 30 may be manufactured by preparing two pieces of base cloth such that margins, to be sewn up, are added to the wall portions 37 and 38. The two pieces of base cloth thus prepared are laid one on another, and sewn together to form a bag. The bag is turned inside out to complete manufacture of the air bag 30. In this case, the mounting holes 40, and the vent hole 41 are formed by intermittently stopping the sewing of the two pieces of base cloth.

Figure 8E:
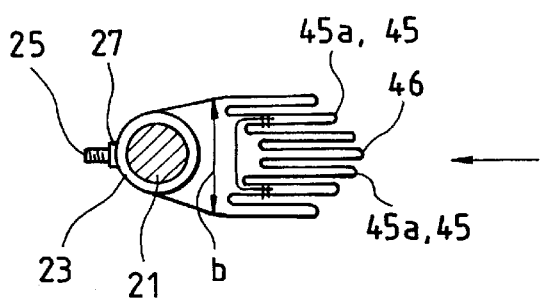
Figure 9:
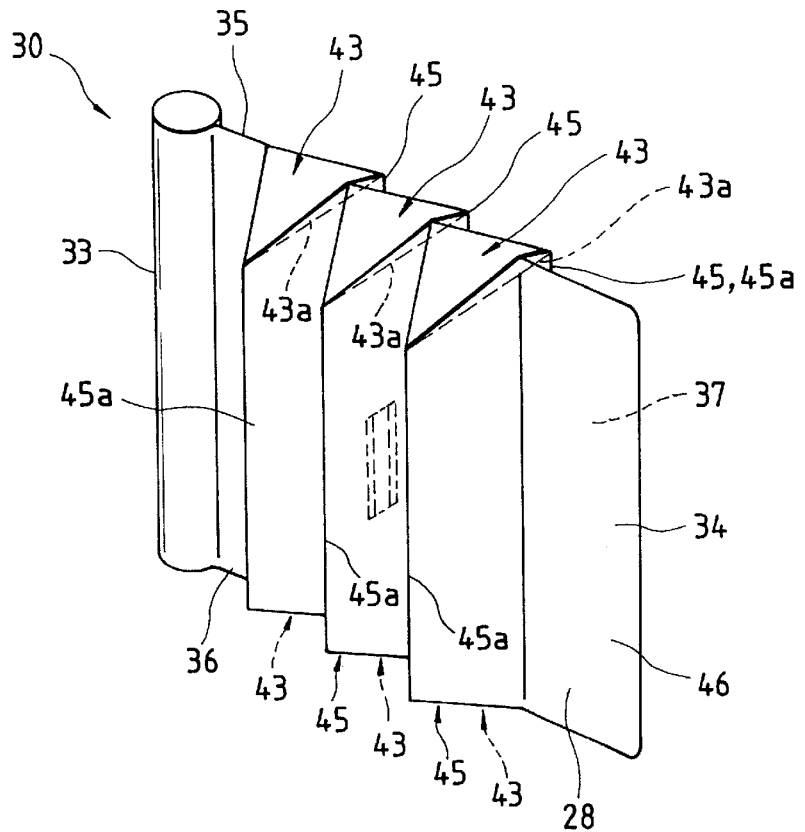
FIG. 9 is a perspective view of the air bag shown in FIG. 4 partially folded.

In the air bag 30, as shown in FIG. 9, the two side edge portions 35 and 36 are folded inwardly (as indicated at 43) at predetermined intervals, or at a plurality of positions (at three positions in FIG. 9) to form first creases 43a which are perpendicular to the side edges 35 and 36 (hereinafter referred to as "in-folded portions 43", when applicable); and the wall portions 37 and 38 are folded outwardly (as indicated at 45) at predetermined intervals, or a plurality of positions (three position in the case of FIG. 9) to form second creases 45a which are perpendicular to the side edges 35 and 36 and continuous to the respective first creases 43a formed before (hereinafter referred to as "out-folded portions 45", when applicable). And, as shown in FIG. 5 and FIG. 8E, the wall portions are folded in such a manner that the portions 45 and 46 which are folded outwardly as viewed in a section perpendicular to the rear edge portion 33 fall forwardly. The outwardly folded portions 46 correspond to the front edge portion 34.

The method of folding the air bag 30 will be described in more detail.

Figure 8A:
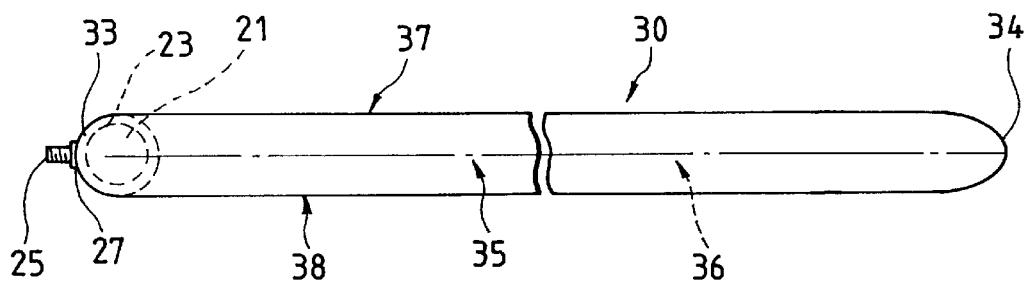
FIGS. 8A to 8E show the sequential steps of folding the air bag shown in FIG. 4.

As shown in FIG. 8A, the inflator 21, on which the mounting brackets 23 have been mounted, are inserted into the air bag 30 through the vent hole 41, and then air is injected into the air bag 30 through the vent hole 41. The bolts 25 of the mounting brackets 23 are extended outside through the mounting holes 40, and spring nuts 27 (FIGS. 5 and 8) are mounted on the bolts 25, to retain the peripheries of the mounting holes 40.

Figure 8B:
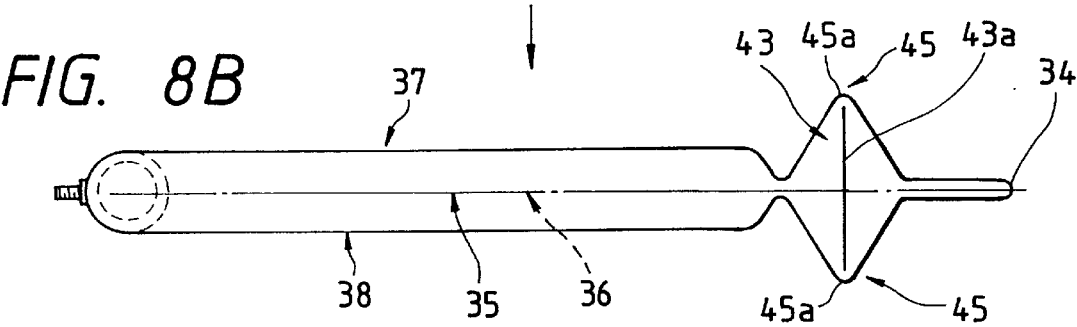

Next, as shown in FIG. 8B, the air bag is folded outwardly as indicated at 43 beginning with the rear edge portion 33 or the front edge portion 34 (but beginning with the front edge portion 34 in the embodiment depicted in the figures) to form a crease 43a, and along the elongation of the crease 43a the two wall portions 37 and 38 are folded outwardly as indicated at 45.

Figure 8C:
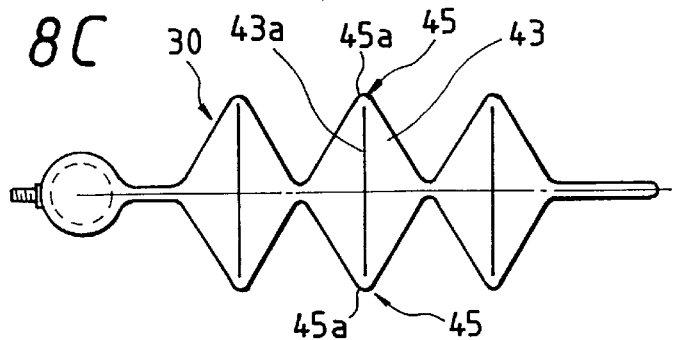
Figure 8D:
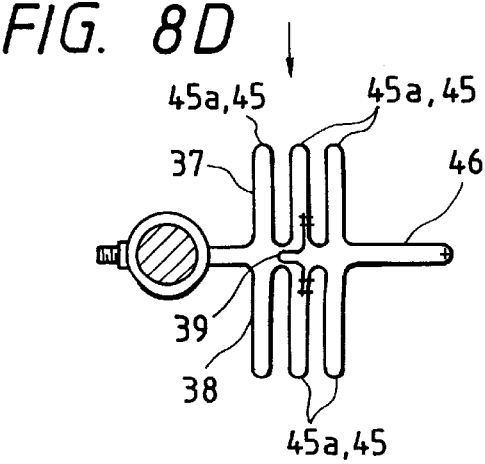

Thereafter, the above-described operation is carried out repeatedly while the air is being discharged through the vent hold 4. As a result, the air bag is shaped as shown in FIG. 8C and in FIG. 9, and finally it appears as shown in FIG. 8D. Thus, the air bag has been folded down while being shrunk.

Under this condition, as shown in the FIGS. 5 and 8E, the portions 45 and 46 which have been folded outwardly as viewed in a section perpendicular to the rear edge 33 are folded down so that they fall forwardly.

In order to prevent the air bag 30 thus folded from being deformed, the air bag 30 is covered with a thin film 28, shown in FIG. 5, such as a breakable and thermal contractive film. The bolts 25 of the mounting brackets 23 protrude through the film 28.

The air bag 30 thus folded, together with the inflator 21, are then mounted on the frame by passing bolts 25 of the mounting brackets 23 through the mounting holes 29c of the bracket 29b and the mounting holes 10a of the frame 10, and are engaged with the nuts 14. Thus, the air bag device 20, which includes the air bag 30, the inflator 21 and the cover 29, has been mounted on the frame 10.

After the air bag device 20 has been mounted on the frame 10 in the above-described manner, the seat back 8 is covered with the surface skin 11, and then the seat assembly 6 is installed on the vehicle body. Under this condition, the end of the lead wire 22 is connected to a predetermined connector.

With the completed air bag device 20 installed in the seat assembly 6 and that has been installed in the vehicle, when necessary a gas producing electrical signal is applied to the inflator 21 through the lead wire 22, to cause the inflator 21 to jet gas through a gas jetting outlet 21a. As a result, the air bag 30 breaks the film 28 and the surface skin 11, and opens the body 29a of the cover 29; that is, the air bag 30 is quickly inflated forwardly as indicated by the two-dot chain lines in FIGS. 4 and 5.

In this case, the two side edge portions 35 and 36, and the two wall portions 37 and 38 are folded like a bellows. Hence, when the inflator 21 jets gas, the gas thus jetted acts on the front edge portion 34 not being obstructed by the creases, so that instantaneously the front edge portion 34 moves forwardly; that is, the air bag is inflated in an extremely short time.

The air bag is readily folded as follows: The creases 43a of the in-folded portions 43 of each of the two side edge portions 35 and 36 are continuous with creases 45a of the out-fold portions 45 of the two wall portions 37 and 38. Hence, is the two side edge portions 35 and 36 are folded inwardly (as indicated at 43) beginning with the rear edge portion 33 or the front edge portion 34, and along the prolongations of the creases 43, the two wall portions 37 and 38 are folded outwardly (as indicated at 45). This operation is carried out up to the opposite edge. Thus, the air bag has been folded with ease while being sufficiently shrunk.

As is apparent from the above description, the air bag is folded so that it is quickly inflated. And the air bag can be manually folded with ease, which contributes to an improvement in productivity of the air bag.

Furthermore, the above-described air bag 30 is so folded that the portions 45 and 46, which are folded outwardly as viewed in a section perpendicular to the rear edge portion 33, fall forwardly. This reduces the width b (cf. FIGS. 5 and 8E) of the air bag 30 thus folded.

Figure 11:
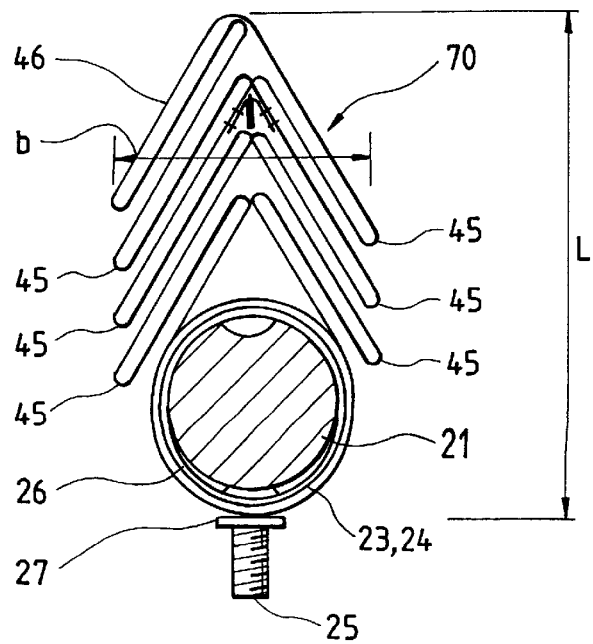
FIG. 11 is a sectional view showing a second embodiment of a folded air bag.

In the above-described air bag 30, the portions 45 and 46, which are folded outwardly as viewed in a section perpendicular to the rear edge portion 33, fall forwardly; however, the invention is not limited thereto or thereby. That is, an air bag 70 as shown in FIG. 11 may be employed. The air bag 70 is folded down in such a manner that the out-folded portions 45 and 46 fall backwardly which are divided substantially into two parts, right and left, covering a part of the inflator 21. With the air bag 70 thus folded, the width b is further reduced, and the length L from the inflator 21 to the front end of the air bag thus folded can be reduced. Hence, the installation of the air bag device 20 requires only a small space.

The above-described air bag 30 has been manually folded. However, it may alternatively be mechanically folded with a folding machine M1 as shown in FIGS. 10A–10F. The folding machine M1, as in FIG. 10A, comprises a position regulating member, namely, a clamp 50 which is adapted to hold the front edge portion 34 to regulate the position thereof. Also, three side edge portion folding boards 51, as in FIG. 10C, and three side edge portion folding boards 52 which are adapted to move and thereby fold the side edge portions 35 and 36 inwardly (as indicated previously at 43), respectively. Additionally, three wall portion folding boards 53 and three wall portion folding boards 54 are provided to fold the wall portions 37 and 38 outwardly (as previously indicated at 45).

The clamp 50 comprises two clamping pieces 50a and 50b which are L-shaped in section. Those clamping pieces are opened and closed by means of an air cylinder (not shown).

The side edge portion folding boards 51 and 52 are positioned opposite one another in a horizontal direction, they are moved toward and away from each other, and they are also able to move towards and away from the clamp 50.

The wall portions folding boards 53 and 54 are arranged shifted from the side edge portion folding boards 51 and 51, and they are mounted opposite each other in a vertical direction, they are moved towards and away from each other, and they are also able to move towards and away from the clamp 50.

The air bag 30 is folded by the folding machine M1 in the following manner.

First, as shown in FIGS. 10A and 10B, the rear end portion 33, in which the inflator 21 has been arranged, is held with the hand, and the front edge portion 34 is held with the clamp 50. Under this condition, an air nozzle (not shown) is inserted into the air bag through the vent hole 41 to supply air into the air bag.

Thereafter, as shown in FIGS. 10C–10F, the wall portion folding boards 53 and 54 are caused to approach each other, while the side edge portion folding boards 51 and 52 are also caused to approach each other. In this operation, the two side edge portions 35 and 36 are folded outwardly by the side edge portion folding boards 51 and 52, thus forming three in-folded portions 43 at the same time. The two wall portions 37 and 38 are folded inwardly by the wall portion folding boards 53 and 54, thus forming three out-folded portion 45 having the creases 45a continuous with the creases 43a of the in-folded portions 43. The excess of air in the air bag 30 is discharged outside through the vent hole 41.

Under this condition, as shown in FIGS. 10E and 10F, the side edge portion folding boards 51 and 52, and the wall portion folding boards 53 and 54 are collectively moved towards the clamp 50.

Thereafter, all the side edge portion folding boards 51 and 52, and all the wall portion folding board 53 and 54 are removed from the air bag thus folded. Thus, the aimed in-folded portions 43 and the out-folded portions 45 have been formed instantaneously. Under this condition, the clamp 50 is released, and the out-folded portions 45 are caused to fall forwardly. The resultant air bag is covered with a heated film 28 and shrunk into place. Thus, the air bag 30 as shown in FIGS. 4 to 6 has been obtained.

The above-described air bag folding method is advantageous in the following points: In the air bag 30, the in-folded portions 43 and the out-folded portions 45 are formed instantaneously, and since the number of steps of folding the air bag is small, the air bag device with the air bag has efficiently produced. Further, the air bag thus folded is inflated quickly in an emergency. If the rear edge portion 33, in which the inflator 21 is arranged, is held and moved with clamping means which is provided additionally, then the air bag may be automatically folded.

If, in the case where the folding machine M1 is employed, the out-folded portions 45 together with the out-folded portions 46 of the front edge portion 33 are laid down backwardly, then an air bag 70 is obtained which is folded as is shown in FIG. 11.

With the above-described folding machine M1, the wall portion folding boards 53 and 54 are pushed against the air bag earlier than the side edge portion folding boards 51 and 52. However, the invention is not limited thereto or thereby. That is, the side edge portion folding boards 51 and 52 may be pushed against the air bag earlier than the wall portion folding boards 53 and 54, or those boards 51 and 52, and 53 and 54 may be pushed against the air bag at the same time.

In the case of FIGS. 8A to 8E and 10A to 10F, while the air bag is being folded, the front edge portion 34 protrudes forwardly. However, it may be folded down as shown in FIGS. 12A to 12E and 13. In a method shown in FIGS. 12A to 12E and 13, after the air bag 30 is filled with air, a supporting board 60 is provided to support the front edge portion. In this case, the air bag can be folded without formation of the out-folded portion 46 in the front edge portion 34. This will be described in more detail.

Figure 12A:
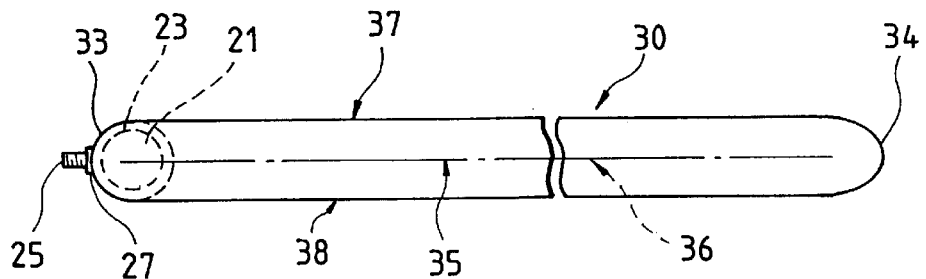
FIGS. 12A to 12E show the sequential steps of folding an air bag in a third embodiment of the invention.

As shown in FIG. 12A, the inflator 21, on which the mounting brackets 13 have been mounted, is inserted into the air bag 30 through the vent hole 41 in advance, and then the air bag 30 is filled with air through the vent hole 41. The bolts 25 of the mounting brackets 23 are allowed to extended through the mounting holes 40. Under this condition, the spring nuts 27 are mounted on the bolts 25 to retain the peripheral edges of the mounting holes, and the front edge portion 34 is pushed against the supporting board 60.

Figure 12B:
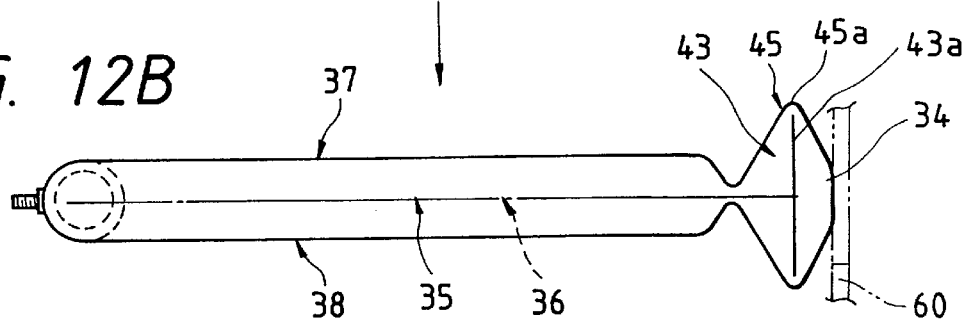
Figure 12C:
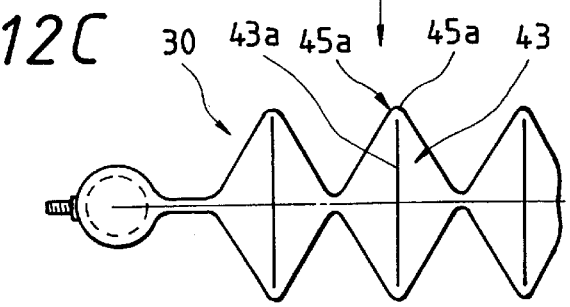

Thereafter, as shown in FIG. 12B, the two side edge portions 35 and 36 are folded inwardly (as indicated at 43) beginning with the rear edge portion 33 or the front edge portion 34 (but beginning with the front edge portion 34 in FIG. 12B) to form a crease 43a, and then the two wall portions 37 and 38 are folded outwardly (as indicated at 45) in correspondence to the crease 43a.

Next, while the air is gradually discharged from the air bag through the vent hole 41, the above-described operation is repeatedly carried out. As a result, the air bag is folded as shown in the part C of FIG. 12, and shrunk as shown in FIG. 12D.

Figure 12E:
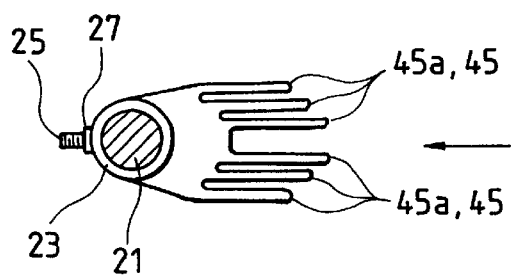
Figure 12D:
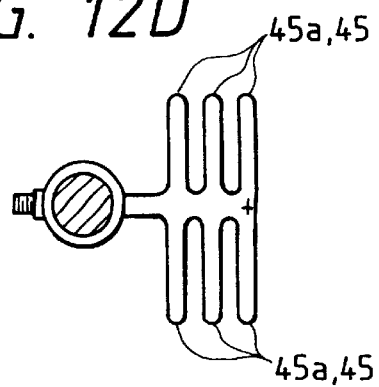

Under this condition, as shown in FIG. 12E, the out-folded portions 45 as viewed in a section perpendicular to the rear edge portion are laid down forwardly.

The above-described folding method can be readily practiced by using a folding machine M2 as shown in FIGS.

13A–13F. The folding machine M2 shown in FIG. 13 is obtained by replacing the position regulating member, namely, the clamp 50 of the folding machine M1 shown in FIGS. 10A–10F with the supporting board 60 which supports the end face of the front end portion to regulate the position of the latter.

The method of folding the air bag 30 with the folding machine M2 will be described in detail.

Figure 13A:
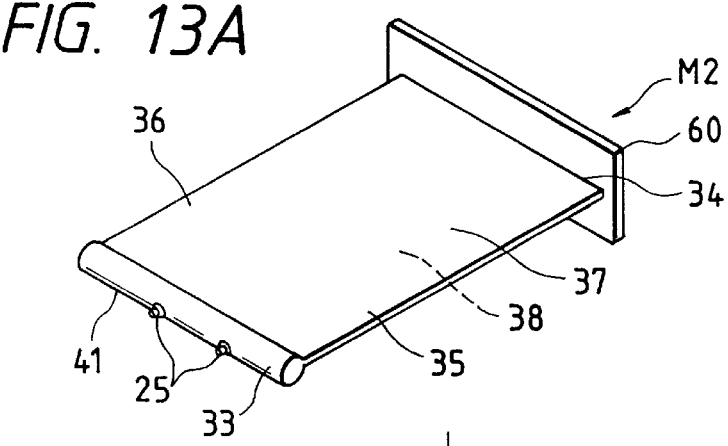
FIGS. 13A–13F show the steps of the method of mechanically folding the air bag shown in FIG. 12.
Figure 13B:
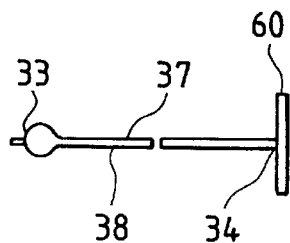
Figure 13C:
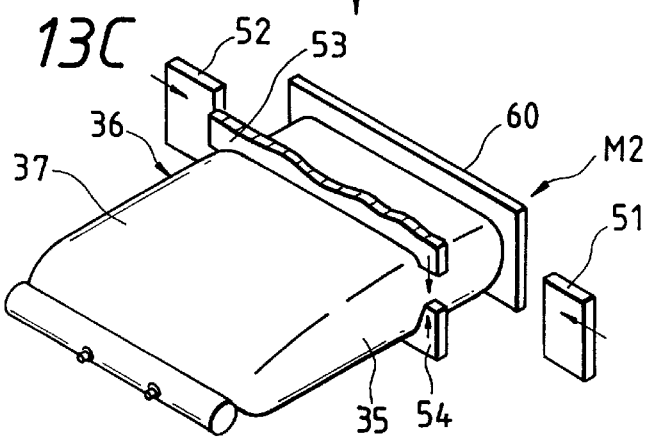
Figure 13D:
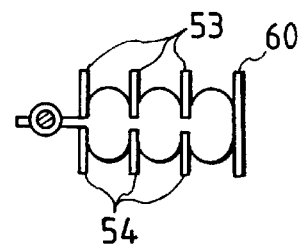

First, as shown in FIGS. 13A and 13B, the rear edge portion, in which the inflator 21 has been arranged, is held with the hand, and an air nozzle (not shown) is inserted into the air bag through the vent hole 41 to supply air into the air bag 30, and the front end portion is pushed against the supporting board 60.

Under this condition, as shown in the middle and lower parts of FIGS. 13C–13F, the wall portion folding boards 53 and 54 are moved toward each other, while the side edge portion folding boards 51 and 52 are also moved toward each other. In this operation, in the two side edge portions 35 and 36, three in-folded portions 43 are formed by the side edge portion folding boards 51 and 52, while in the two wall portions 37 and 38, three out-folded portions 45 having creases 45a continuous with the creases 43a of the in-folded portions 43 are formed by the wall portion folding boards 53 and 54. An excess of air in the air bag is discharged therefrom.

Figure 13E:
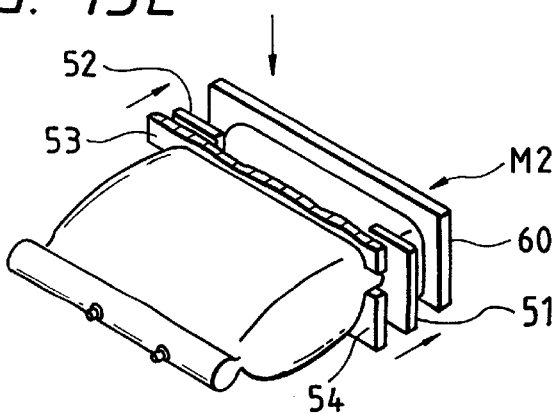
Figure 13F:
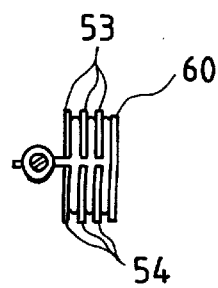

Thereafter, as shown in FIGS. 13E and 13F, the side edge portion folding boards 51 and 52, and the wall portion folding boards 53 and 54 are collectively moved towards the supporting board 60.

Under this condition, the side edge portion folding boards 51 and 52, and the wall portion folding boards 53 and 54 are removed from the air bag. As a result, the in-folded portions 43 and the out-folded portions 45 are instantaneously formed as required. The out-folded portion 45 are laid down forwardly. Then, the air bag thus folded is covered with a heated film 28 which shrinks into place. Thus, the desired air bag 30 has been obtained which has been so folded as to be mounted on the seat back.

The above-described air bag folding method is advantageous in the following points: In the air bag 30, the in-folded portions 43 and the out-folded portions 45 are formed instantaneously, and since the number of steps of folding the air bag is small the air bag can be formed efficiently. And the air bag thus folded can be inflated quickly. If the rear edge portion 33, in which the inflator 21 is arranged, is held and moved with clamping means which is provided additionally, then the air bag may be automatically folded.

Figure 14:
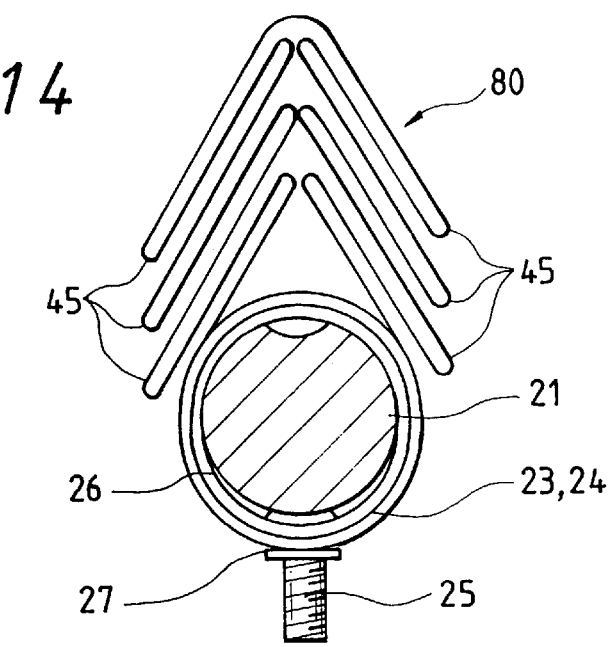
FIG. 14 is a sectional view of a fourth embodiment of a folded air bag.

If, in the case where the folding machine M2 is employed, the out-folded portions 45 are laid down backwardly while being divided substantially uniformly in two parts, right and left, then an air bag 80 is obtained which is folded as shown in FIG. 14.

Figure 15:
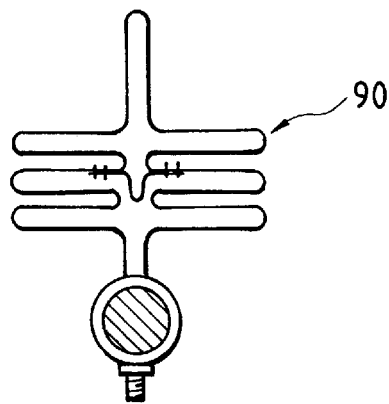
FIG. 15 is a sectional view of a fifth embodiment of the invention.
Figure 16:
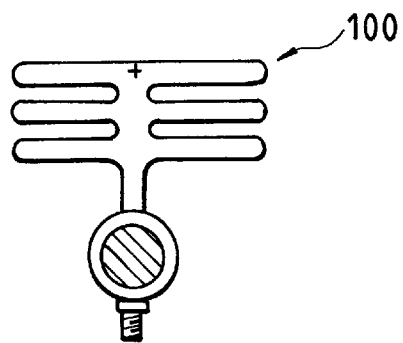
FIG. 16 is a sectional view of a sixth embodiment of the invention.

In the above-described embodiments, in the final step of folding the air bag, as shown in FIG. 8E, FIG. 11, FIG. 12E, and FIG. 14, the portions 45 and 46, which are folded outwardly as viewed in a section perpendicular to the rear end portion, are laid down forwardly, or are laid down backwardly while being divided substantially uniformly in two parts, right and left. However, the air bag may be coupled to the air bag device 20 omitting the final step of folding the air bag, as in the cases of air bags 90 and 100, shown respectively in FIGS. 15 and 16. The bag folding state shown in FIGS. 15 and 16 is not compact; however, it should be noted that the air bag is so folded down like a bellows that it is quickly inflated. Furthermore, the air bag is not of the petal folding type, and therefore it can be folded down with ease.

In the above-described embodiments, the inflator 21 is provided inside each of the air bags 30, 70, 80, 90 and 100. However, if the air bag is provided with a gas flow inlet, then the inflator may be provided outside the air bag.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air bag for use in an air bag device and having a substantially rectangular form when inflated, comprising:
   a rear edge along which an inflator for supplying an inflating gas is attached;
   two side edges which extend from opposing ends of said rear edge so as to be substantially parallel with each other;
   a front edge; and
   a pair of walls located between said front and rear edges so as to define two opposing faces of the air bag when inflated, and
   said air bag when folded comprises:
      said two side edges folded inwardly forming first creases in said two side edges, and
      said pair of walls folded outwardly to form second creases which are perpendicular to said first creases and continuous with said first creases; and
      said front edge being located closer to said rear edge than when inflated, so that said front edge is located in front of said rear edge.

2. The folded air bag according to claim 1, wherein portions of said air bag which are folded outwardly as viewed in a section perpendicular to said rear edge fall forwardly.

3. The folded air bag according to claim 1, wherein portions of said air bag which are folded outwardly as viewed in a section perpendicular to said rear edge fall backwardly with said portions substantially divided in two parts.

4. The folded air bag according to claim 1, further comprising a teaser which couples said pair of walls so as to keep the substantially rectangular form when inflated.

5. The folded air bag according to claim 1, wherein said air bag is formed by woven cloth made of one of polyamide and polyester.

6. An air bag according to claim 1, wherein said two side edges and said pair of walls are folded successively.

7. An air bag according to claim 1, wherein said front edge is positioned adjacent to said second creases.

8. An air bag according to claim 1, wherein said front edge is folded over and is positioned on top of said second creases.

9. An air bag according to claim 1, wherein said front edge is laid over and is located closer to said rear edge than said second creases.

* * * * *